(12) United States Patent
Brown

(10) Patent No.: US 11,584,175 B2
(45) Date of Patent: Feb. 21, 2023

(54) REMOTELY RELEASABLE TOW LINE ASSEMBLY AND METHOD FOR USING THE SAME

(71) Applicant: David George Brown, Rehoboth Beach, DE (US)

(72) Inventor: David George Brown, Rehoboth Beach, DE (US)

(73) Assignee: NitroSew LLC, Rehoboth Beach, DE (US)

( * ) Notice: Subject to any disclaimer, the term of this patent is extended or adjusted under 35 U.S.C. 154(b) by 74 days.

(21) Appl. No.: 16/949,443

(22) Filed: Oct. 29, 2020

(65) Prior Publication Data

US 2021/0129607 A1    May 6, 2021

Related U.S. Application Data

(60) Provisional application No. 62/929,219, filed on Nov. 1, 2019.

(51) Int. Cl.
*B60D 1/18* (2006.01)
*B60D 1/26* (2006.01)

(52) U.S. Cl.
CPC ............... *B60D 1/187* (2013.01); *B60D 1/26* (2013.01)

(58) Field of Classification Search
CPC ................................ B60D 1/187; B60D 1/565
USPC ................................................ 280/480, 480.1
See application file for complete search history.

(56) References Cited

U.S. PATENT DOCUMENTS

| | | | | |
|---|---|---|---|---|
| 1,371,335 A | * | 3/1921 | Walles | B60D 1/187 280/480 |
| 1,451,658 A | * | 4/1923 | Hennekin | B60D 1/187 280/480 |
| 1,540,854 A | * | 6/1925 | Mack | B60D 1/04 24/115 F |
| 1,599,353 A | * | 9/1926 | Albin | B60D 1/182 267/74 |

(Continued)

FOREIGN PATENT DOCUMENTS

| | | | | |
|---|---|---|---|---|
| CA | 2224771 A1 | * | 6/1999 | ........... B63B 35/815 |
| CH | 409661 A | * | 3/1966 | |

(Continued)

OTHER PUBLICATIONS

DE-2722243-A1 English Translation of Description Espacenet (Year: 2022).*
GB-518629-A Description Espacenet (Year: 2022).*

*Primary Examiner* — Jacob B Meyer
*Assistant Examiner* — Myles A Harris
(74) *Attorney, Agent, or Firm* — Dunlap Bennett & Ludwig, PLLC

(57) ABSTRACT

A remotely releasable tow line is provided. The tow line has a releasable latch at a distal end that is removably connected to a race car. The releasable latch is operatively associated with a cable handle adjacent to a proximal end of the tow line. Accordingly, a user disposed on a tow vehicle, to which the proximal end is connected, may manipulate the cable handle so that the release latch disconnects from the race car, in such a way that while the race car is still being towed it is unhooked from the tow vehicle, thereby saving time in getting the race car in a pit area where the race car can be tended to before its soon-approaching next race.

11 Claims, 3 Drawing Sheets

(56) References Cited

U.S. PATENT DOCUMENTS

| | | | | |
|---|---|---|---|---|
| 1,828,385 | A | * | 10/1931 | Bergemann ............... B60D 1/26 |
| | | | | 280/504 |
| 2,392,368 | A | * | 1/1946 | Dilbert ..................... B60D 1/04 |
| | | | | 280/504 |
| 2,393,657 | A | * | 1/1946 | Rudnick ................. B60D 1/26 |
| | | | | 280/477 |
| 2,399,364 | A | * | 4/1946 | Lewison ................. B60D 1/26 |
| | | | | 280/504 |
| 4,225,149 | A | * | 9/1980 | Koopman ............... B60D 1/26 |
| | | | | 280/477 |
| 4,416,073 | A | * | 11/1983 | Vicino .................... G09F 19/00 |
| | | | | 40/538 |
| 4,756,700 | A | * | 7/1988 | Coleman ............... B62B 13/043 |
| | | | | 441/65 |
| 5,009,183 | A | * | 4/1991 | Naypaver ............... B63B 34/60 |
| | | | | 114/253 |
| 5,624,137 | A | * | 4/1997 | Lesesne ................. B60K 15/06 |
| | | | | 280/514 |
| 6,050,587 | A | * | 4/2000 | Panhausen ............... B60D 1/18 |
| | | | | 280/480 |
| 8,562,383 | B2 | * | 10/2013 | Weiss ...................... B63B 34/60 |
| | | | | 114/253 |
| 11,235,630 | B1 | * | 2/2022 | Cox, III ................. B60D 1/187 |
| 11,485,180 | B2 | * | 11/2022 | Najarro .................... D07B 1/02 |
| 2013/0134689 | A1 | * | 5/2013 | Barajas ................... B60D 1/18 |
| | | | | 280/480 |
| 2016/0297265 | A1 | * | 10/2016 | Sparkes ................. B60D 1/187 |
| 2021/0213790 | A1 | * | 7/2021 | Boraggina ............. B60D 1/185 |

FOREIGN PATENT DOCUMENTS

| | | | | |
|---|---|---|---|---|
| CN | 107791759 | A | * | 3/2018 |
| CN | 111497536 | B | * | 11/2021 ............... B60D 1/04 |
| DE | 818731 | C | * | 10/1951 |
| DE | 2722243 | A1 | * | 11/1978 |
| DE | 29614979 | U1 | * | 6/1997 ............... B60D 1/18 |
| DE | 2910910 | A1 | * | 8/1997 |
| FR | 26290 | E | * | 9/1923 |
| FR | 752986 | A | * | 10/1933 |
| FR | 797263 | A | * | 4/1936 |
| GB | 518629 | A | * | 3/1940 |
| GB | 2223244 | A | * | 4/1990 ............... B60D 1/18 |
| GB | 2591705 | A | * | 8/2021 ............... B60D 1/04 |
| JP | 2018046789 | A | * | 3/2018 |
| KR | 19990002807 | U | * | 1/1999 |

\* cited by examiner

REMOTELY RELEASABLE TOW LINE ASSEMBLY AND METHOD FOR USING THE SAME

CROSS-REFERENCE TO RELATED APPLICATION

This application claims the benefit of priority of U.S. provisional application No. 62/929,219 filed 1 Nov. 2019, the contents of which are herein incorporated by reference.

BACKGROUND OF THE INVENTION

The present invention relates to racing accessories and, more particularly, a quick release tow line designed for use by racing teams to enable a more rapid release of race vehicles being towed to the pit area.
Seconds Count Drag racing is not your typical motor sport in many ways—particularly the limited amount of time between races. Understanding drag race timing is important to understanding the advantages of the present invention.

In drag racing, race teams must qualify to compete in a multi-car field. It is advantageous to qualify in the highest possible position, as the quickest car is matched against the slowest car in round one. Plus, the quickest three teams get bonus points towards the championship points count to determine the champion and the winner of a substantial amount of money.

Typically, each race team gets four (4) chances to qualify, prior to race day, and qualifying rounds are limited to one day. Though, sometimes weather may decrease the number of attempts that can be had in that one day (yet another reason timing between races is of the essence). Thus, qualifying rounds are very important to the race teams.
Between Rounds: After Crossing the Finish Line and Before the Start of the Next Race After the race car passes the 1000-foot mark (end of race) they enter a slow-down area that is about one-half mile long. This allows the teams to deploy its two parachutes and brake to a stop. At that point the team recovery vehicle and crew members recover the race car. Specifically, the recovery vehicle will hook up a tow line to the race car and begin to tow it back towards its "pit stall" for service.

On the way to the pit stall, the race team tows the race car back around behind the race stands to stop ('in line') with other teams to have the race car pulled onto weighing scales to verify the car's weight meets the rules. After it is pulled off the scales it is towed back into the race pit stalls where the car is released and glides into the correct position to begin its between rounds servicing.

This servicing includes, among other things, that the engine is completely rebuilt, the clutches are all replaced, the tires and the fuel filled up, the parachute re-installed, etc.

In short, the race car covers 1000 feet in under four seconds (from a standing start) at 330 miles per hour. The race car's next race starts in 45 to 60 minutes. Thus, the race team gets, at most, one (1) hour to return the race car back to the pit stall and rebuild it as described above before being called back to the starting lanes for the next round. As can be seen, maximizing the timing that the race car can spend in the pit stall is critical. That time in the pit stall is a function of how fast the race car can be towed from the finish line and into the pit stall.

Currently, getting and positioning the race car in the pit stall entails the crew members jumping off the towing (recovery) vehicle in order to push the race car back and forth to maneuver it into the pit stall—this can take two to three precious minutes.

Watching a drag race, one will observe the team members pull away and take the car with them. While they are wrapping the parachutes up (to avoid dragging them along the surface) and that they have already started removing parts of the car to replace, as every part of the engine and drive train is replaced in between each round by a group of skilled crew members.

As explained above, drag race teams are under strict time restrictions when competing at the track, and the long tow back from the finish line to the team's pit stall burns up valuable time as the current solutions require teams to stop the tow vehicle and unhook the race car, then push the race car the final distance into the pit stall—which are time consuming and labor intensive.

As can be seen, there is a need for quick release tow line designed for use by racing teams to enable a more rapid release of race vehicles being towed to the pit stall. The quick release tow line embodied in the present invention (colloquially known as the "Toad Rope") enables users to release the race car while it is still in motion with the simple tug of a release cord, so thereafter the gliding race car is controllable by one person in the towing vehicle. In other words, the present invention allows the race car to be pulled back to the pit area and then be remotely released, allowing the race car to glide into its pit area without stopping and without requiring the assistance of the pit crew to unhook the towed vehicle. Thereby, the present invention allows teams to shorten turn-around times as it requires no team members to physically unhook and push the race car the final distance.

SUMMARY OF THE INVENTION

In one aspect of the present invention, a tow line includes the following: a releasable latch moveable between a closed position and an open position; and a cable extending at least six feet from a proximal end to a distal end connected to the releasable latch, wherein manipulating the proximal end of the cable moves the releasable latch to the open position.

In another aspect of the present invention, the above tow line also includes the following: a releasable latch moveable between a closed position and an open position and a cable extending at least six feet from a proximal end to a distal end connected to the releasable latch, wherein manipulating the proximal end of the cable moves the releasable latch to the open position; a tow strap extending between a distal end and a proximal end, wherein the distal end is connected to the releasable latch, wherein the proximal end is connected to a tow vehicle; a channel disposed through the tow strap from at least a proximal cable opening to a distal cable opening, wherein the cable openings are inward for their respective ends of the tow strap, and wherein the cable is disposed in the channel between and then protrudes from the cable openings, wherein the releasable latch includes a pin connected to the distal end of the cable in such a way to move coaxial with the distal end when the releasable latch moves to the open position, wherein the releasable latch further includes a front hook having an inner surface that tapers downward and toward the cable openings, wherein the pin engages said inner surface in the closed position; a race car having a connection point to which the releasable latch is removably attached in the closed position; a tow vehicle having a tow connection point to which the proximal end of the tow strap is removably attached; and a tension strap connected adjacent the proximal end of the two strap.

In yet another aspect of the present invention a method of towing a race car includes the following: providing the above-mentioned tow line and situating a user in a rear portion of the tow vehicle, wherein the user manually engages the proximal end of the cable and a proximal end of the tension strap, wherein the user puts a foot on the tow line.

These and other features, aspects and advantages of the present invention will become better understood with reference to the following drawings, description and claims.

DETAILED DESCRIPTION OF THE INVENTION

Figure 1:
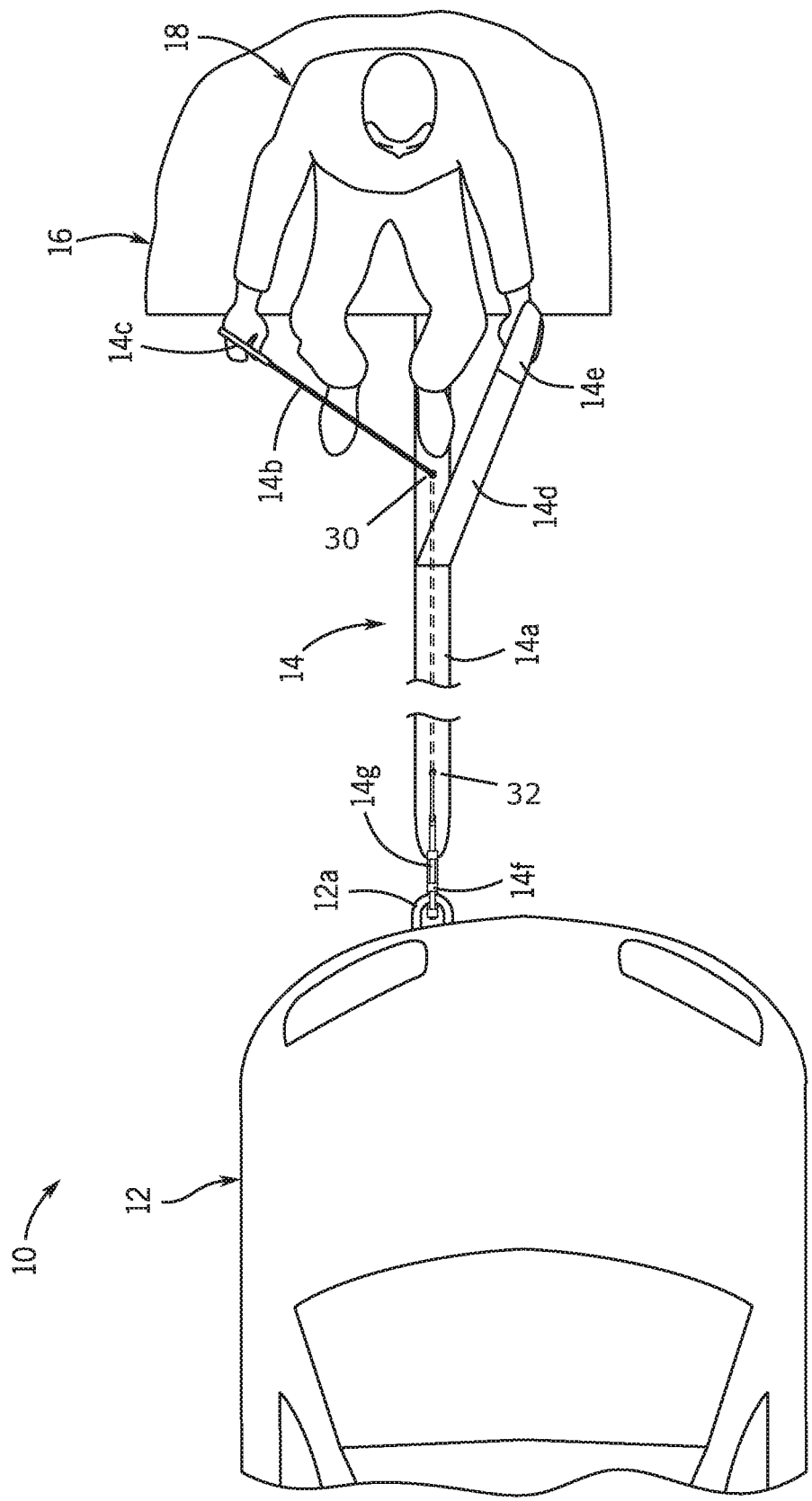
FIG. 1 is a top plan view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a remotely releasable tow line. The tow line has a releasable latch at a distal end that is removably connected to a race car. The releasable latch is operatively associated with a cable handle adjacent to a proximal end of the tow line. Accordingly, a user disposed on a tow vehicle, to which the proximal end is connected, may manipulate the cable handle so that the release latch disconnects from the race car, so that while the race car is still being towed it is untethered from the tow vehicle, thereby saving time in getting the race car in a pit area where the race car can be tended to before its soon-approaching next race.

Referring now to FIGS. 1 through 4, the present invention may include a remotely releasable tow line assembly 10 embodying a tow line assembly 14 extending from a proximal end 40 associated with a tow vehicle 16 and a distal end 50 releasably coupled to a race car 12. The tow vehicle 16 may provide a connection point 16a to removably attach the proximal end 40 of the remotely releasable tow line assemble 10. The tow connection point 16a may be a first tow hook or equivalent. The tow connection point 16a is typically disposed low on the tow vehicle 16, and thus adjacent to the ground. Likewise, the race car 12 provides a car connection point 12a that is a second tow hook or equivalent, which is also disposed adjacent to the ground level.

The tow line assembly 14 will be made from materials of sufficient strength and durability as contemplated herein, include pulling the load of the race car 12. Thus, high-strength webbing may be used for the strapping components of the tow line assembly 14.

Figure 2:
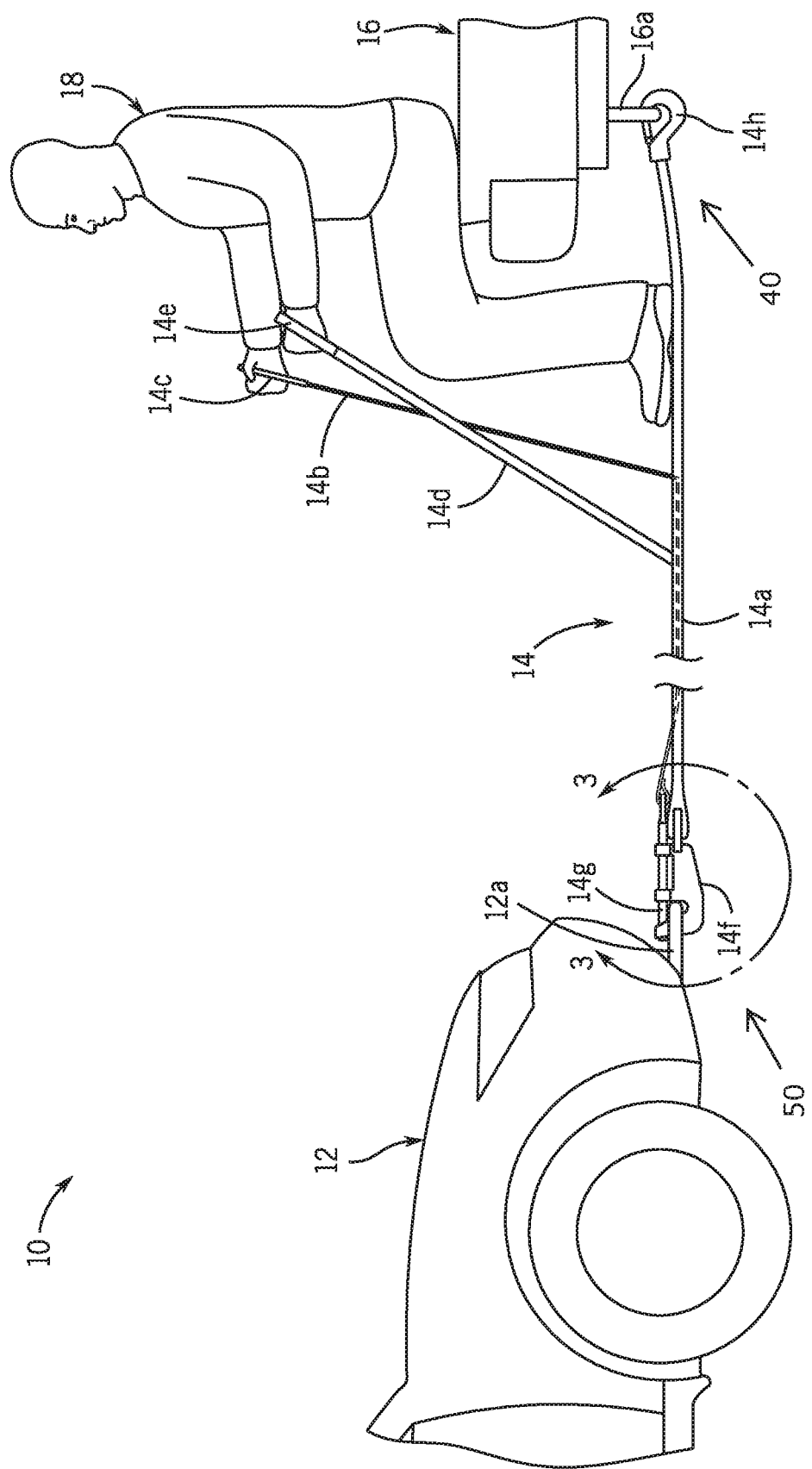
FIG. 2 is a side elevation view of an exemplary embodiment of the present invention.
Figure 3:
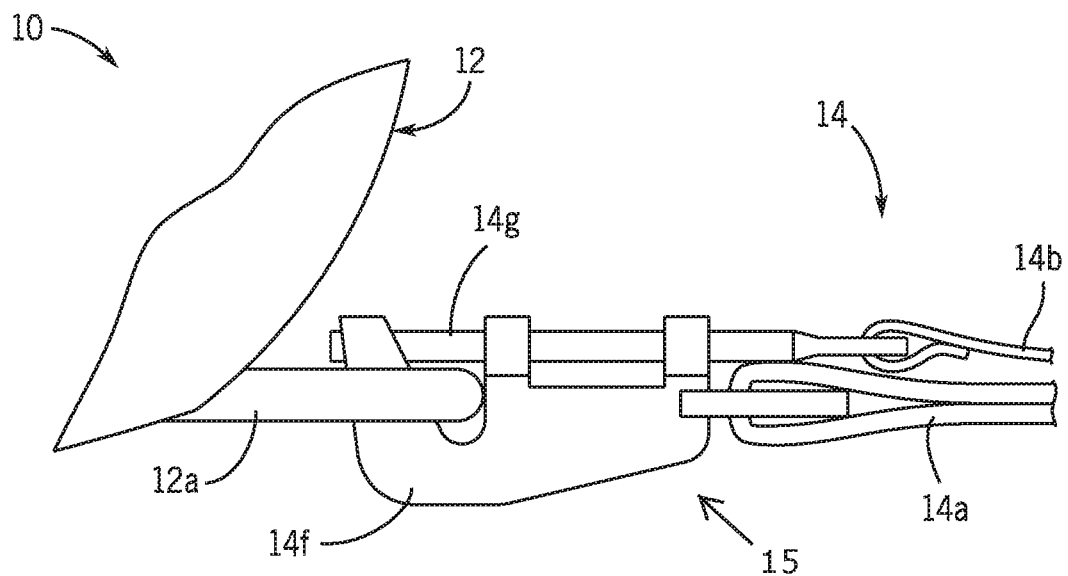
FIG. 3 is a detailed side elevation view of an exemplary embodiment of the present invention, taken along line 3-3 in FIG. 2, illustrating a closed position of the quick release latch—i.e., an engaged condition.
Figure 4:
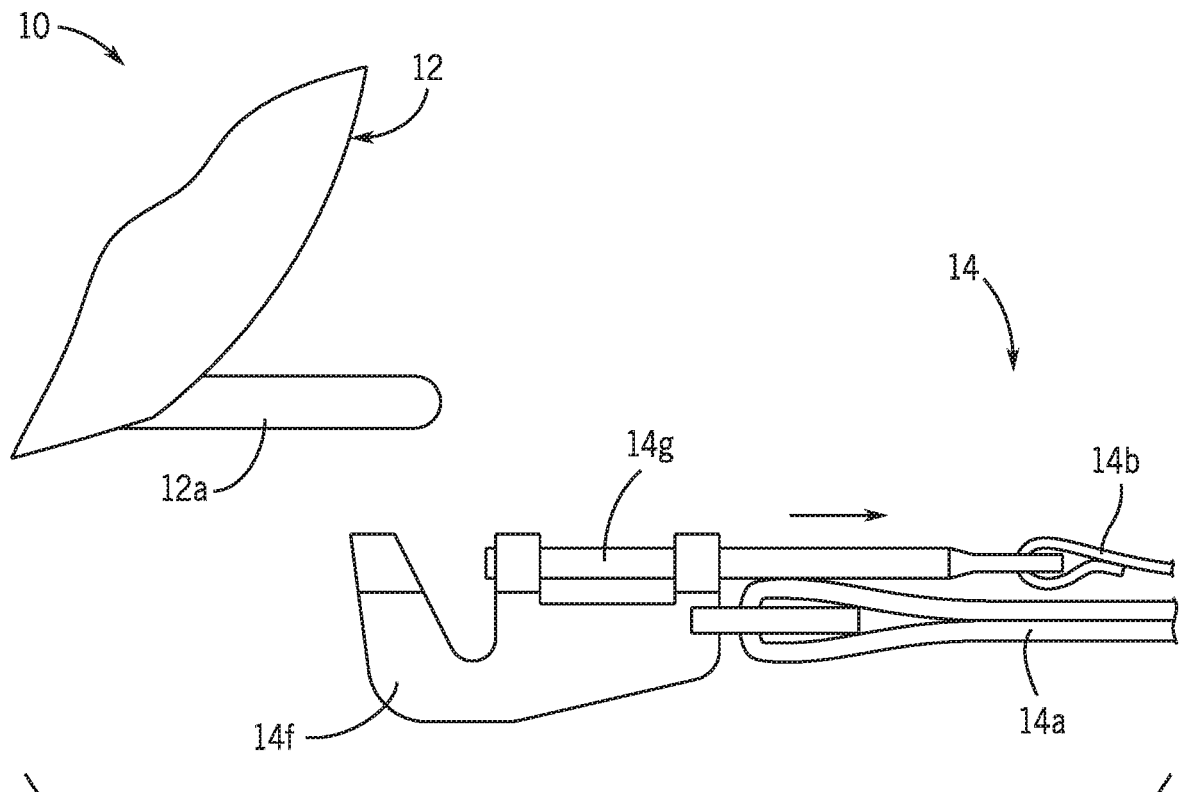
FIG. 4 is similar to FIG. 3 but illustrating an open position/disengaged condition.

The tow line assembly 14 includes a tow strap 14a providing a channel through which a cable 14b may be disposed. In FIGS. 1 and 2, the cable disposed in the channel is represented by a dashed line. The channel may extend at least from the distal end 50 to a proximal cable opening 30. The proximal cable opening is between the distal and proximal ends 40 and 50, 'car-ward' from the proximal end 40 within the first eight feet thereof. 'Car-ward' is understood to be toward the race car 12 relative to the proximal end 40. The proximal cable opening 30 may be reinforced with a grommet or the like.

The tow strap 14a may provide a proximal connector 14h at its proximal end and at its distal end the tow strap 14a may be connected to a quick release latch 15. The proximal connector 14h may be an attachment hook or equivalent that removably connects to the tow connection point 16a. The quick release latch 15 removable attaches to the car connection point 12a as disclosed more below.

Even further car-ward, a tension strap 14d may connect to the tow strap 14a. The tension strap 14d may terminate at a strap handle 14e, wherein the tension strap 14d is dimensioned and adapted to be in arm's reach of a user/crew member 18, typically situated on a rearward/car-ward portion of the tow vehicle 16, as illustrated in FIGS. 1 and 2. The proximal end of the cable 14b may provide a cable handle 14c also dimensioned and adapted to be similarly manually controlled by the user/crew member 18.

At the distal end 50, a pin 14g that may be generally coaxially connected to the distal end of the cable 14b that protrudes out of the channel of the tow strap 14a at the proximal cable opening 32. The distal cable opening 32 may be within the first three feet of the distal end 50 and may be reinforced with a grommet or the like. The pin 14g may be operatively associated with the quick release latch 15 having barrels or equivalent through which the pin 14g axially slides between a closed position/engaged condition and an open position/disengaged condition.

The front hook 14f of the quick release latch 15 is designed to ensure it will not snag on the frame but drop clear. The retractable pin 14g of the quick release latch 15 is engineered to stay in the open position until it is manually returned to the closed position.

A method of using the present invention may include the following. The remotely releasable tow line assembly 10 disclosed above may be provided. The proximal and distal ends and of the tow line 14 can now be controlled by one user 18 who sits in the rear of the tow vehicle 16. This is almost always an open-back (hatch-type) tow vehicle 16 that allows the person to rest his or her foot on the tow strap/line 14a while wrapping the tension strap 14d over and/or around their arm and holding the cable handle 14c in their other hand. An urging, such as a quick tug, on the cable handle 14c effectuates/urges the quick release latch 15 to move from the closed position to the open position by way of the pin 14g axially sliding in the direction of the urged cable 14b. From there, the tapered surface (tapering downward toward the tow vehicle 16) of the front hook 14f slides or falls under the influence of gravity from the car connection point 12a (tow hook/loop).

When "time is of the essence" and towing a race car 12 is required with only one person to control the towed race car, the remotely releasable tow line assembly 10 functionality disclosed above can control the rate of the tow and the release feature makes the unhooking of the race car 12 smooth and effortless, saving time and work effort. The present invention simply reduces towing times (by way of the quick release) and does not require a team to stop the towing process to unhook the race car.

A method of manufacturing the present invention may include the following a tubular webbing, flat webbing and a wire cable may be provided. These materials may be cut to the required length as needed, wherein the tubular webbing, in certain embodiments, may be cut to eighteen feet and wherein a corresponding section of flat webbing is positioned inside the tubular webbing for adding support. The tubular webbing may have interior 1¾-inch flat webbing sewn in place for added strength and reducing material stretch associated with the tubular webbing. The cable is slidably received through the channel of the tubular webbing, except where the cable exits and enters the tubular webbing adjacent to the proximal and distal ends and by way of through holes reinforced by gromets. The process of aligning the interior composition of the tubular webbing is critical to ensure that the cable glides without being hampered by other material.

The distal end attaches to the race car frame by way of quick release latch. The quick release latch is designed and adapted to avoid damage to aerodynamic from car features and ensure proper release. The proper selection and position of the quick release latch is paramount to correct operation of the product. The proximal end may connect with the towing vehicle by way of a tow hook.

The proximal end of the tow line may be manufactured in a similar fashion. The proximal end may also include a pull release adapted to allow the activation of the quick release latch on the other end. This may be done by forming a long cable with a loop on the end. It may then pass through the tubular webbing, for easy handling, and then fastened back over itself with crimps and shrink wrap. The proximal end may also include a tension strap to allow for any fluctuation in tension during the towing. The tension strap may be added through forming from tubular webbing and again getting sewn into a handle at the end.

The quick release latch may be connected to the distal end by way of folding the distal end. The distal reinforced through hole enables the cable to operative associate with the quick release latch. The quick release latch may be made from Titanium for durability and designed to attach to the race vehicle frames (in an upside-down manner to allow it to drop free to the ground when released) by being movable between a closed position/engaged condition and an open position/disengaged condition by way of the operative association of the wire cable.

It should be understood, of course, that the foregoing relates to exemplary embodiments of the invention and that modifications may be made without departing from the spirit and scope of the invention as set forth in the following claims.

What is claimed is:

1. A tow line comprising:
   a tow strap extending between a proximal strap end and a distal strap end;
   a channel disposed through the tow strap from at least a proximal cable opening to a distal cable opening, wherein the cable openings are inward from their respective ends of the tow strap;
   a releasable latch moveable between a closed position and an open position; and
   a cable extending at least six feet from a proximal cable end to a distal cable end connected to the releasable latch,
   wherein the cable is disposed in the channel between the cable openings, and wherein the cable is configured to be freely slidable relative to the tow strap so that tugging the proximal cable end moves the releasable latch to the open position without moving the distal strap end.

2. The tow line of claim 1, wherein the proximal end is connected to a tow vehicle.

3. The tow line of claim 1, wherein the releasable latch comprises a pin connected to the distal end of the cable in such a way to move coaxial with the distal end when the releasable latch moves to the open position.

4. The tow line of claim 3, wherein the releasable latch further comprises a front hook having an inner surface that tapers downward and toward the cable openings, wherein the pin engages said inner surface in the closed position.

5. The tow line of claim 4, further comprising a vehicle having a car connection point to which the releasable latch is removably attached in the closed position, and wherein in the open position the releasable latch falls away from the car connection point solely as a result of gravity.

6. The tow line of claim 5, further comprising a tow vehicle having a tow connection point to which the proximal end of the tow strap is removably attached.

7. The tow line of claim 6, further comprising a tension strap connected adjacent the proximal end of the tow strap.

8. A method of towing a race car, the method comprising:
   providing the tow line of claim 7; and
   situating a user in a rear portion of the tow vehicle, wherein the user manually engages the proximal end of the cable and a proximal end of the tension strap.

9. The method of claim 8, wherein the user puts a foot on the tow line.

10. A tow line for a remote disengagement of a moving race vehicle from a tow vehicle, the tow line comprising:
    a tow strap extending between a distal connection point fixed to the race vehicle and a proximal connection point fixed to the tow vehicle, wherein the tow strap comprises, sequentially, from the distal connection point to the proximal connection point:
    a releasable latch;
    a distal cable opening;
    a proximal cable opening; and
    a proximal connector,
    wherein a cable passing into a channel of the tow strap and out of said channel by way of the proximal and distal cable openings, respectively, enables the remote disengagement.

11. The tow line of claim 10, wherein a tension strap is sequentially disposed between the distal cable opening and the proximal cable opening.

\* \* \* \* \*